(12) United States Patent
Geiser et al.

(10) Patent No.: US 10,883,599 B2
(45) Date of Patent: Jan. 5, 2021

(54) HYDRAULIC PISTON ASSEMBLY

(71) Applicant: Schaeffler Technologies AG & Co. KG, Herzogenaurach (DE)

(72) Inventors: Jordan Geiser, Dalton, OH (US); Brandon Heitger, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/420,399

(22) Filed: May 23, 2019

(65) Prior Publication Data

US 2020/0370648 A1    Nov. 26, 2020

(51) Int. Cl.
| | |
|---|---|
| *F16J 1/08* | (2006.01) |
| *F04B 53/14* | (2006.01) |
| *F04B 1/124* | (2020.01) |
| *F16J 1/02* | (2006.01) |
| *F03C 1/26* | (2006.01) |

(52) U.S. Cl.
CPC ............. *F16J 1/08* (2013.01); *F04B 1/124* (2013.01); *F04B 53/143* (2013.01); *F03C 1/26* (2013.01); *F16J 1/02* (2013.01)

(58) Field of Classification Search
CPC .... F16H 2041/246; F16H 48/30; F16H 48/22; F16D 25/083; F16D 25/0638; F16D 13/52; F16D 13/70; F16D 7/027; F16D 23/14
See application file for complete search history.

(56) References Cited

U.S. PATENT DOCUMENTS

| | | | | |
|---|---|---|---|---|
| 5,931,275 A * | 8/1999 | Kasuya | ............... | F16H 63/3026 192/109 R |
| 6,733,411 B1 * | 5/2004 | Kaplan | ................... | F16H 48/22 192/103 F |
| 7,410,042 B2 * | 8/2008 | Ochab | ................... | F04B 1/0404 192/48.92 |
| 7,448,482 B2 * | 11/2008 | Park | ........................ | F16D 25/02 192/103 F |
| 7,553,251 B2 * | 6/2009 | Nett | ........................ | B60K 17/34 475/221 |
| 8,388,487 B2 * | 3/2013 | Fujii | ..................... | F16D 27/115 475/150 |
| 8,640,844 B2 * | 2/2014 | Kuwahara | ............. | F16D 25/082 192/113.5 |
| 8,668,615 B2 * | 3/2014 | Schmidt | ................ | F16D 25/082 475/221 |
| 9,234,551 B2 | 1/2016 | Heitzenrater et al. | | |
| 9,534,678 B2 * | 1/2017 | Imamori | ................. | F16H 35/10 |
| 9,593,724 B2 * | 3/2017 | Hemphill | ................ | F16D 13/52 |
| 9,765,829 B2 * | 9/2017 | Carr | ........................ | F16D 13/52 |
| 10,267,401 B2 * | 4/2019 | Valente | ................... | F16H 48/36 |
| 10,337,567 B2 * | 7/2019 | Nakamura | .......... | F16H 57/0453 |

(Continued)

FOREIGN PATENT DOCUMENTS

| | | |
|---|---|---|
| JP | 2000-230575 A | 8/2000 |
| WO | 2016095911 A1 | 6/2016 |

*Primary Examiner* — Thomas E Lazo
(74) *Attorney, Agent, or Firm* — Lekeisha Suggs (57) ABSTRACT

A piston assembly for a transmission includes a piston and a washer connected to the piston. In one embodiment, the washer includes a circumferential ring that extends continuously about an inner diameter, wherein a cavity is defined between the piston and the washer. A bearing element is retained and centered on the washer by the circumferential ring.

14 Claims, 6 Drawing Sheets

(56) References Cited

U.S. PATENT DOCUMENTS

| | | |
|---|---|---|
| 10,590,997 B2 * | 3/2020 | Barnes .................. F16D 25/083 |
| 10,641,343 B2 * | 5/2020 | Barnes .................... F16D 13/70 |
| 2007/0284206 A1 | 12/2007 | Davis |
| 2015/0267760 A1 | 9/2015 | Hemphill et al. |
| 2016/0273653 A1 | 9/2016 | Tamashima et al. |
| 2017/0016491 A1 | 1/2017 | Carr et al. |
| 2018/0266496 A1 * | 9/2018 | Fujinuma ............ F16D 25/0638 |
| 2019/0085911 A1 * | 3/2019 | Barnes .................... F16D 25/12 |

* cited by examiner

HYDRAULIC PISTON ASSEMBLY

TECHNICAL FIELD

The present disclosure relates to piston assemblies for a transmission and more specifically to piston assemblies composed of stamped components.

BACKGROUND

Transmission systems may include clutch assemblies. Such clutch assemblies may include a piston. During an engagement, the piston may be urged towards a clutch pack. An axial force from the piston may ultimately cause the clutch to be engaged.

SUMMARY

According to embodiments of the present disclosure, a piston assembly for a transmission is provided. The piston assembly comprises a piston and a washer connected to the piston. In one embodiment, the washer includes a circumferential ring that extends continuously about an inner diameter, wherein a cavity is defined between the piston and the washer. A bearing element is retained and centered on the washer by the circumferential ring. The bearing element includes at least one bearing roller contactable with the washer and a cage including a circumferential ring. The circumferential ring of the washer includes a radial protrusion and the circumferential ring of the cage is retained on the washer by the radial protrusion. The washer may be connected to the piston at radially outer ends of the piston and the washer. The piston may further include a circumferential ring disposed at an outer diameter of the piston and the washer may include a radially extending section disposed within the circumferential ring of the piston connecting the piston and the washer. The piston and washer may be formed by stamping.

In other embodiments, a piston assembly for a transmission is disclosed having a piston arranged for sealing engagement with a housing. A washer is connected to the piston, wherein a cavity is defined between the piston and the washer. Inner and outer seals are disposed on inner and outer surfaces, respectively, of the piston for sealing the piston to the housing. A retaining plate may be connected to the piston and configured to retain the inner and outer seals on the piston. The piston assembly may also include a bearing element including at least one bearing roller contactable with the washer and a cage retained on the washer, wherein the cage is configured to position the at least one bearing roller. The cage may include a circumferential ring and the washer may include at least one tab extending from an inner diameter thereof in an axial direction with a radial protrusion at a distal end. The cage circumferential ring is retained by the radial protrusion. In one embodiment, the washer is connected to the piston by a staked connection at radially outer ends of the piston and the washer. In another embodiment, the piston includes an axially extending section having an outer surface and an inner surface, the washer includes an axially extending section, and the washer axially extending section is fixed to the inner surface of the piston axially extending section via a press-fit connection. The outer seal is disposed on the outer surface of the piston axially extending section. In other embodiments, the piston includes a radially extending section, the washer includes a radially extending section, and the piston radially extending section is fixed to the washer radially extending section by welding. In embodiments, the retaining plate is fixed to a radially extending section of the piston, and the piston radially extending section is located radially between the inner and outer seals.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein should be understood to be referring to the orientation of the structure depicted in the figures. If an object is said to be extending about an axis, then terms such as "radial," "axial," and "circumferential" are relative to the axis. For example, the "axial" direction is one along or parallel to an axis such as a central axis, and the "radial" direction is normal to the axial direction. The "circumferential" direction refers to movement about the axis. "Inner" and "outer" also are relative to the axis; for example, an "inner surface" may be a surface facing the axis, and an "outer surface" may be a surface facing away from the axis. Rotation can be relative to the axis. These terms can be used as explained above unless otherwise noted.

Figure 1:
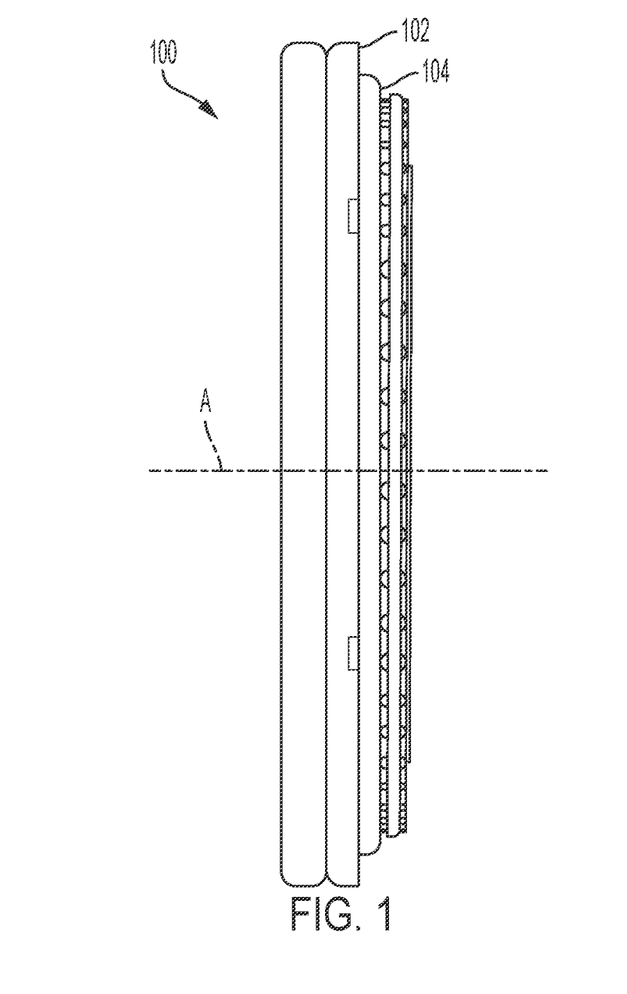
FIG. 1 shows a piston assembly according to embodiments of the present disclosure.
Figure 2:
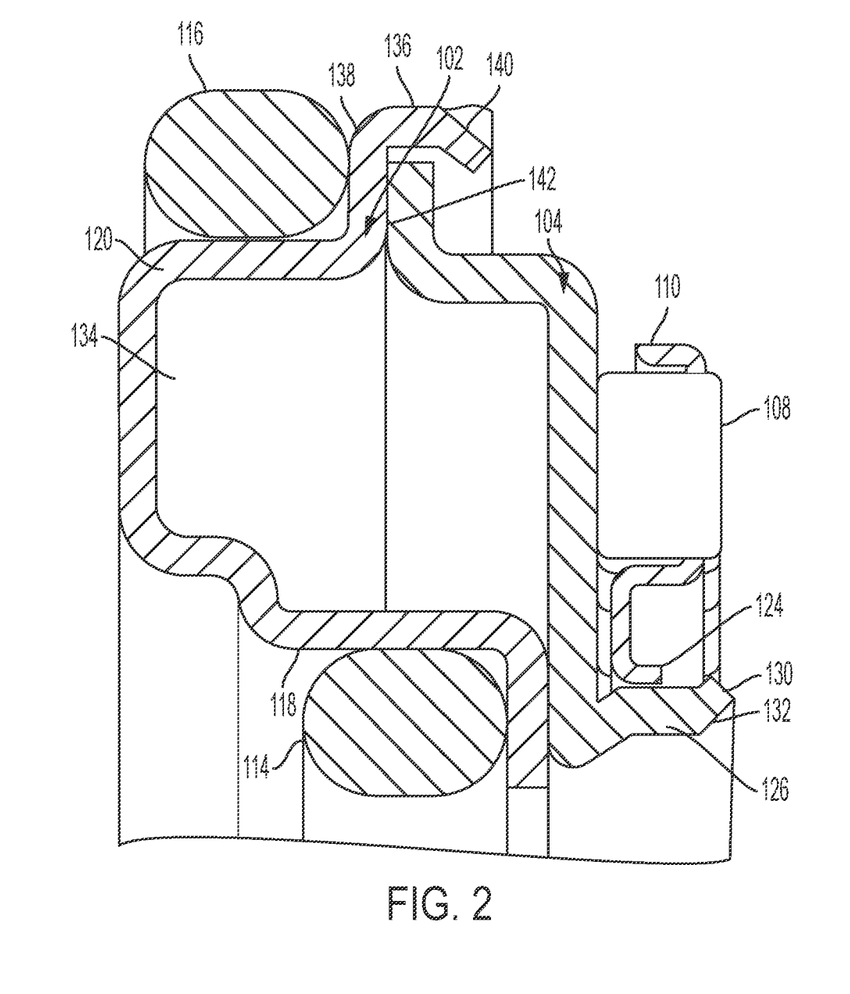
FIG. 2 shows a partial cross-sectional view of the piston assembly of FIG. 1.
Figure 3:
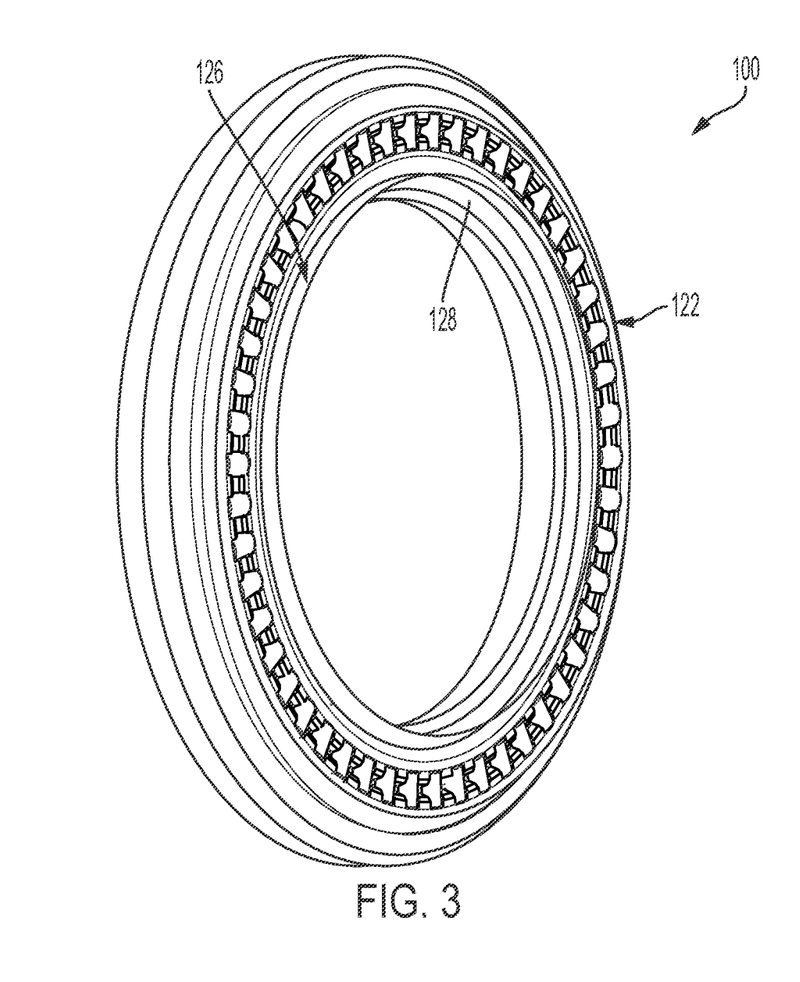
FIG. 3 shows an isometric back view of the piston assembly of FIG. 1.
Figure 4:
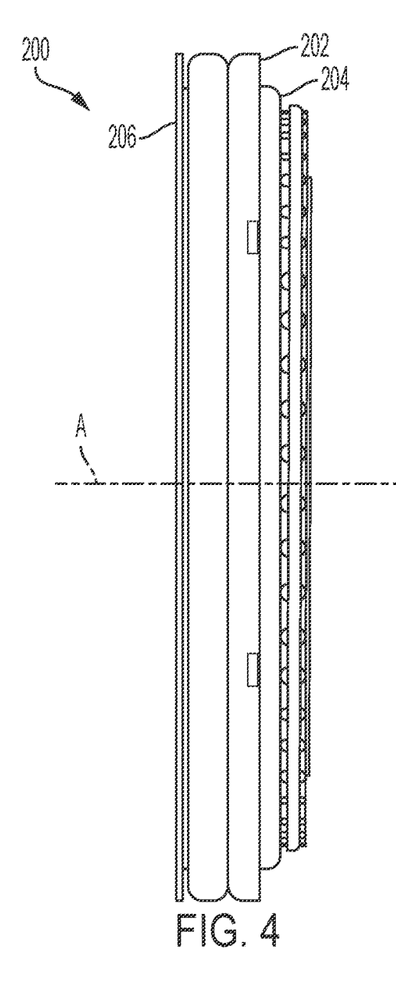
FIG. 4 shows an alternate embodiment of a piston assembly including a retaining plate.

The following description is made with reference to piston assembly 100 shown in FIGS. 1-3. Piston assembly 100 may include piston 102, washer 104, bearing rolling element 108, and cage 110. Piston 102 and washer 104 may be formed by stamping and may be formed from sheet metal, such as steel, for example. That is, piston 102 and washer 104 are stamped sheet metal parts. Piston 102 may include seal 114 and seal 116 provided to seal piston assembly 100 to a piston housing that piston assembly 100 may be disposed within. Seals 114 and 116 may be O-rings, for example. Seals 114 and 116 may be installed in piston grooves 118 and 120. Seal 114 is located radially inward of seal 116 relative to axis A. In other words, seals 114 and 116 are radially inner and outer seals, respectively.

Bearing rolling element 108 may be arranged and retained on washer 104. Bearing rolling element 108 may be one of a plurality of rolling elements, such as cylindrical rollers, arranged to roll between washer 104 and another clutch component, such as a reaction plate (not shown). Cage 110 is for retaining and positioning bearing rolling elements 108 radially and maintaining proper spacing in a circumferential direction. Cage 110 may be retained by washer 104 as described below. Bearing rolling element 108 and cage 110 may be collectively referred to as a bearing element 122. Washer 104 may act as a bearing race and thrust surface for the bearing element 122. In one embodiment, the bearing element may be a needle roller bearing, for example.

Cage 110 may include circumferential ring 124. Washer 104 may include circumferential ring, or lip, 126 extending from, and continuously about, an inner diameter 128 of washer 104 to center bearing element 122 (collectively, bearing rolling element 108 and cage 110). Circumferential ring 126 of washer 104 includes radial protrusion or bump 130 at distal end 132. Circumferential ring 124 of cage 110 may be retained by radial protrusion 130. That is, cage 110 may be retained on washer 104 and prevented from being removed by radial protrusion 130. Radial protrusion 130 may be a pre-formed feature in which case cage 110 would be snapped onto washer 104, or radial protrusion 130 may be formed after cage 110 is installed onto washer 104 by staking or the like.

Piston 102 and washer 104 are fixed together and arranged to form cavity, or void, 134 therebetween in which fluid cannot reach or enter. Piston 102 and washer 104 are arranged such that dead volume within the internal space of a piston housing (see, e.g., FIG. 5) is eliminated or reduced. For example, a ratio of dead volume to total volume occupied by piston assembly 100 within the internal space of a piston housing may be 10% or less. Preferably, the ratio of dead volume is 5% or less. Eliminating or reducing dead volume within the piston is important because a large amount of dead volume is bad for piston performance.

Referring to FIG. 2, piston 102 and washer 104 are fixed together by staking. Piston 102 may include a circumferential ring 136 disposed at an outer diameter 138 thereof. A radially extending section 142 of washer 104 is disposed within piston circumferential ring 136 wherein a staked connection 140 may be formed between piston circumferential ring 136 and washer 104 to fix piston 102 and washer 104 together.

The following description is made with reference to piston assembly 200 shown in FIGS. 4-8. Piston assembly 200 may include piston 202, washer 204, retaining plate 206, bearing rolling element 208, and cage 210. Piston 202, washer 204, and retaining plate 206 may be formed by stamping and may be formed from sheet metal, such as steel, for example. That is, piston 202, washer 204, and retaining plate 206 are stamped sheet metal parts. Piston 202 may be sealed to housing 212 by seal 214 and seal 216. Seals 214 and 216 may be O-rings, for example. Seals 214 and 216 may be installed in piston grooves 218 and 220, respectively, for sealing with radially inner surface 222 and radially outer surface 224, or circumferential surfaces, of housing 212. In other words, seals 214 and 216 are radially inner and outer seals, respectively. Seal 216 is located radially outward from seal 214 relative to axis A. Radially inner surface 222 and radially outer surface 224 may define an internal space within housing 212.

Bearing rolling element 208 may be arranged and retained on washer 204. Bearing rolling element 208 may be one of a plurality of rolling elements, such as cylindrical rollers, arranged to roll between washer 204 and another clutch component, such as a reaction plate (not shown). Cage 210 is for retaining and positioning bearing rolling elements 208 radially and maintaining proper spacing in a circumferential direction. Cage 210 may be retained by washer 204 as described below. Bearing rolling element 208 and cage 210 may be collectively referred to as a bearing element. Washer 204 may act as a bearing race and thrust surface for the bearing element. In one embodiment, the bearing element may be a needle roller bearing.

Cage 210 may include circumferential ring 226. Washer 204 may include tabs 228 extending in an axial direction with radial protrusion or bump 230 at distal end 232. Circumferential ring 226 of cage 210 may be retained by radial protrusion 230. That is, cage 210 may be retained on washer 204 and prevented from being removed by radial protrusion 230. Radial protrusion 230 may be a pre-formed feature in which case cage 210 would be snapped onto washer 204, or radial protrusion 230 may be formed after cage 210 is installed onto washer 204 by staking or the like. In the embodiment shown herein, washer 204 includes eight tabs 228. However, it is to be understood that fewer or more tabs could be used.

Piston 202 and washer 204 are fixed together and arranged to form cavity, or void, 234 therebetween in which fluid cannot reach or enter. Piston 202 and washer 204 are arranged such that dead volume within the internal space of housing 212 is eliminated or reduced. For example, a ratio of dead volume to total volume occupied by piston assembly 200 within the internal space of housing 212 may be 10% or less. Preferably, the ratio of dead volume is 5% or less. As discussed above, a large amount of dead volume decreases piston performance.

Figure 5:
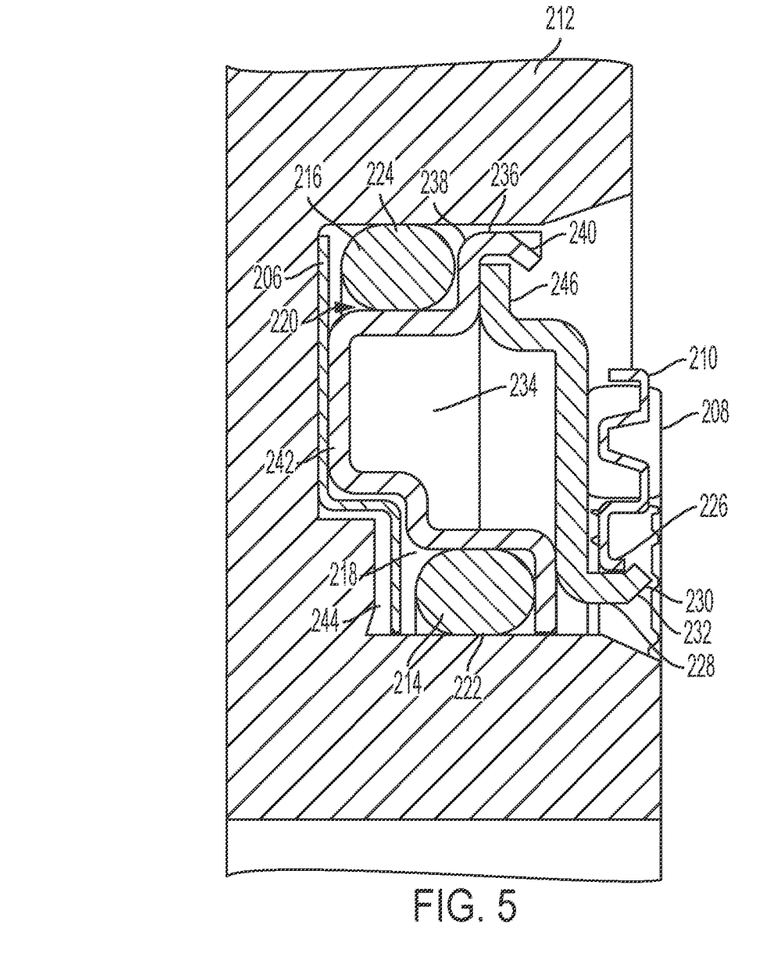
FIG. 5 shows a partial cross-sectional view of the piston assembly of FIG. 4.
Figure 6:
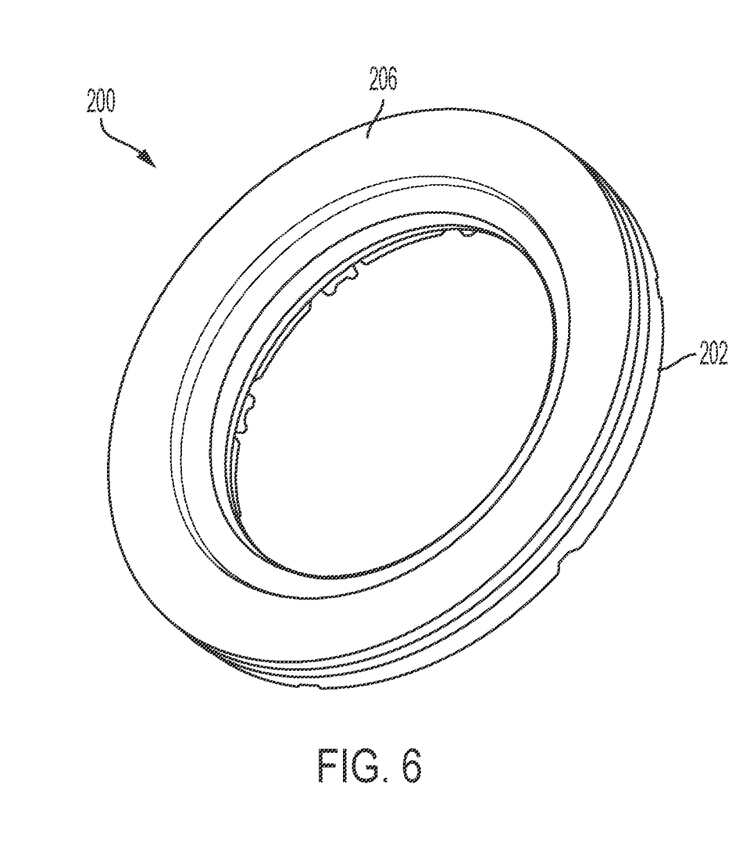
FIG. 6 shows an isometric front view of the piston assembly of FIG. 4.
Figure 7:
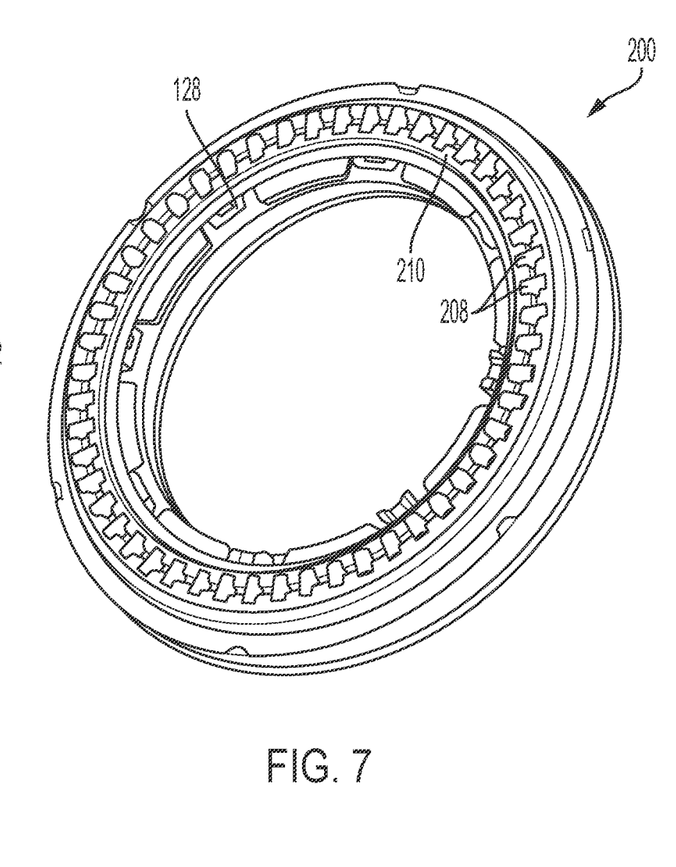
FIG. 7 shows an isometric back view of the piston assembly of FIG. 4.
Figure 8:
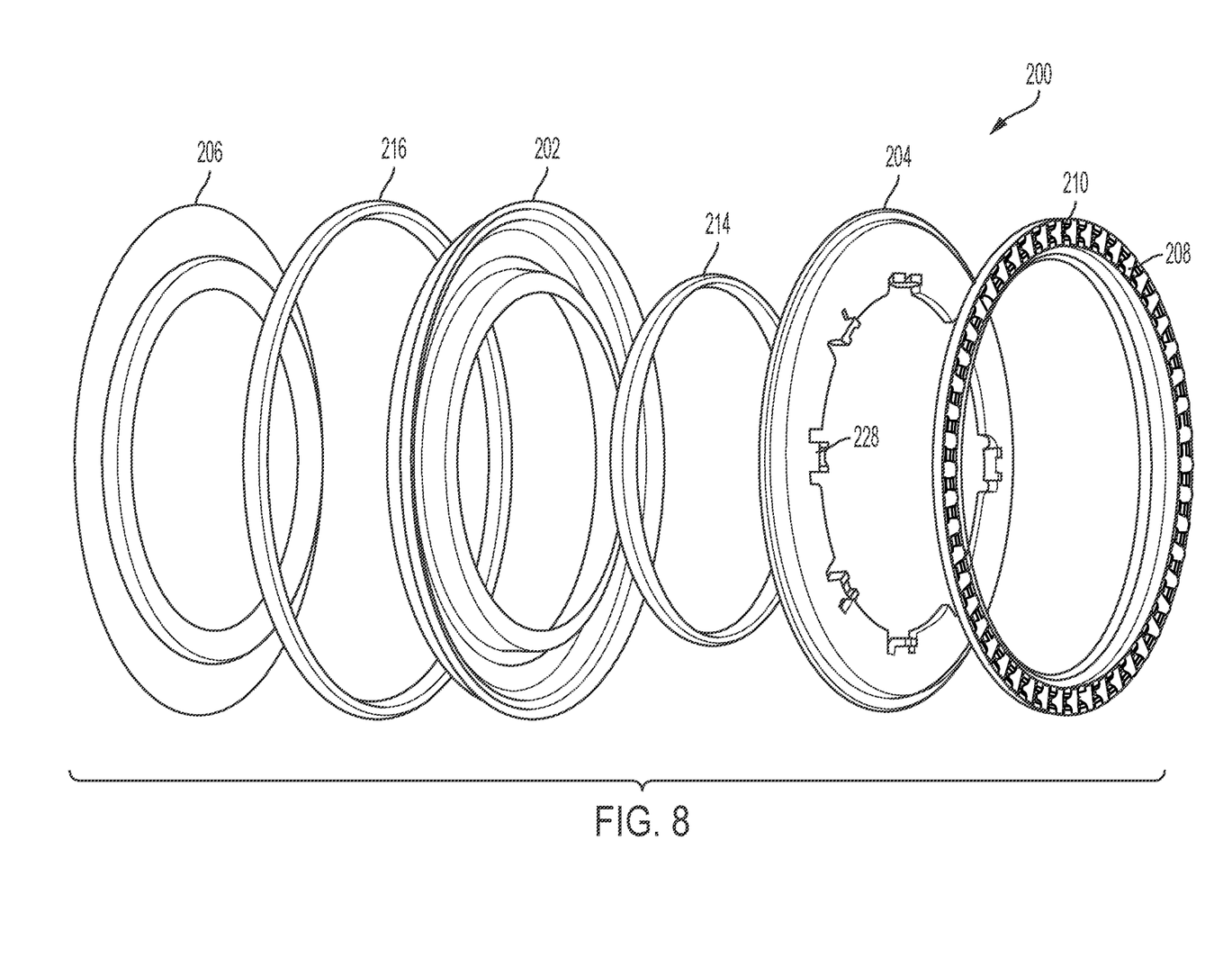
FIG. 8 shows an exploded view of the piston assembly of FIG. 4.

Referring to FIG. 5, piston 102 and washer 104 are fixed together by staking. Piston 202 may include a circumferential ring 236 disposed at an outer diameter 238 thereof. A radially extending section 246 of washer 204 is disposed within piston circumferential ring 236 wherein a staked connection 240 may be formed between piston circumferential ring 236 and washer 204 to fix piston 202 and washer 204 together.

A chamber 244 may be formed between piston 202 and housing 212. That is, chamber 244 may be bounded, in part, by piston 202, seals 214 and 216, and housing 212. Chamber 244 may be configured to receive a hydraulic fluid via an opening or channel in housing 212 (not shown). A hydraulic pressure from the hydraulic fluid acts against retaining plate 206 and piston 202 to activate a clutch. Seals 214 and 216 seal chamber 244 preventing fluid loss.

Piston assembly 200 may further include retaining plate 206 that is disposed between piston 202 and housing 212 and arranged to retain seals 214 and 216. Retaining plate 206 is fixed to piston radially extending section 242, wherein piston radially extending section 242 is located radially between seals 214 and 216. Retaining plate 206 may be fixed to piston 202 by welding, for example.

Figure 9A:
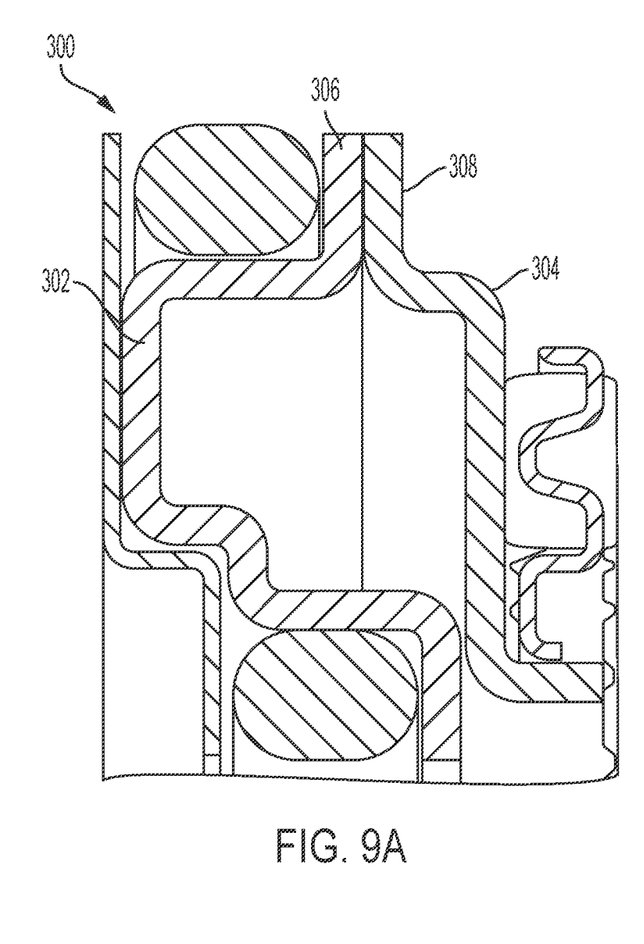
FIG. 9A shows an alternate embodiment of a piston assembly with the piston and washer fixed together via welding according to embodiments of the present disclosure.
Figure 9B:
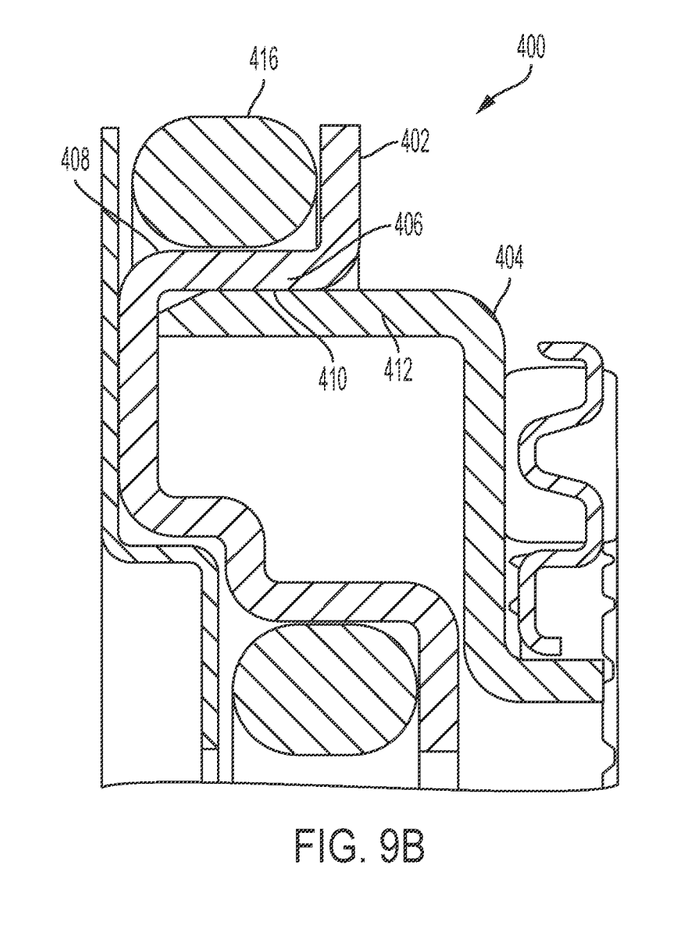
FIG. 9B shows an alternate embodiment of a piston assembly with the piston and washer fixed together via a press-fit connection according to embodiments of the present disclosure.

The following description is made with reference to FIGS. 9A and 9B. FIGS. 9A and 9B disclose alternate embodiments for fixing a piston and washer together. FIG. 9A shows a piston assembly 300 with piston 302 and washer 304 fixed together via welding. That is, piston 302 includes radially extending section 306 and washer 304 includes radially extending section 308. Piston radially extending section 306 is fixed to washer radially extending section 308 by welding. FIG. 9B shows a piston assembly 400 with piston 402 and washer 404 fixed together via a press-fit connection. That is, piston 402 includes axially extending section 406 having outer surface 408 and inner surface 410. Washer 404 includes axially extending section 412. Washer axially extending section 412 is fixed to inner surface 410 of piston axially extending section 406 via a press-fit connection. Seal 416 is disposed on outer surface 408 of piston axially extending section 406 for sealing piston 402 to a housing.

Embodiments disclosed herein provide several advantages such as reducing dead volume within the piston and providing a piston assembly comprised of stamped components that allow for easier manufacturing, along with cost and weight savings.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 piston assembly
102 piston
104 washer
108 bearing rolling element
110 cage
114 seal
116 seal
118 piston groove
120 piston groove
122 bearing element
124 circumferential ring
126 circumferential ring
128 inner diameter
130 radial protrusion
132 distal end
136 piston circumferential ring
138 outer diameter
140 staked connection
142 radially extending section
200 piston assembly
202 piston
204 washer
206 retaining plate
208 bearing rolling element
210 cage
212 housing
214 seal
216 seal
218 piston groove
220 piston groove
222 inner surface
224 outer surface
226 circumferential ring
228 tabs
230 radial protrusion
232 distal end
236 circumferential ring
238 outer diameter
240 staked connection
242 piston radially extending section
244 chamber
246 radially extending section
300 piston assembly
302 piston
304 washer
306 piston radially extending section
306 radially extending section
308 washer radially extending section
400 piston assembly
402 piston
404 washer
406 piston axially extending section
408 outer surface
410 inner surface
412 washer axially extending section
416 seal

What is claimed is:

1. A piston assembly for a transmission, comprising:
a piston;
a washer connected to the piston and including a circumferential ring that extends continuously about an inner diameter, wherein a cavity is defined between the piston and the washer; and
a bearing element retained and centered on the washer by the circumferential ring, wherein:
the washer is connected to the piston at radially outer ends of the piston and the washer; and
the piston includes a circumferential ring disposed at an out diameter of the piston and the washer includes a radially extending section disposed within the circumferential ring of the piston connecting the piston and the washer.

2. The piston assembly of claim 1, wherein:
the bearing element includes at least one bearing roller contactable with the washer and a cage including a circumferential ring;
the circumferential ring of the washer includes a radial protrusion; and the circumferential ring of the cage is retained on the washer by the radial protrusion.

3. The piston assembly of claim 1, wherein the piston is formed by stamping.

4. The piston assembly of claim 1, wherein the washer is formed by stamping.

5. A piston assembly for a transmission, comprising:
a piston arranged for sealing engagement with a housing;
a washer connected to the piston, wherein a cavity is defined between the piston and the washer;
inner and outer seals disposed on inner and outer surfaces, respectively, of the piston for sealing the piston to the housing; and
a retaining plate connected to the piston and configured to retain the inner and outer seals on the piston.

6. The piston assembly of claim 5, further comprising a bearing element including:
at least one bearing roller contactable with the washer; and
a cage retained on the washer, wherein the cage is configured to position the at least one bearing roller.

7. The piston assembly of claim 6, wherein:
the cage includes a circumferential ring;
the washer includes at least one tab extending from an inner diameter thereof in an axial direction with a radial protrusion at a distal end; and
the cage circumferential ring is retained by the radial protrusion.

8. The piston assembly of claim 5, wherein the piston is formed by stamping.

9. The piston assembly of claim 5, wherein the washer is formed by stamping.

10. The piston assembly of claim 5, wherein the washer is connected to the piston by a staked connection at radially outer ends of the piston and the washer.

11. The piston assembly of claim 5, wherein:
the piston includes an axially extending section having an outer surface and an inner surface;
the washer includes an axially extending section; and
the washer axially extending section is fixed to the inner surface of the piston axially extending section via a press-fit connection.

12. The piston assembly of claim 11, wherein the outer seal is disposed on the outer surface of the piston axially extending section.

13. The piston assembly of claim 5, wherein:
the piston includes a radially extending section;
the washer includes a radially extending section; and
the piston radially extending section is fixed to the washer radially extending section by welding.

14. The piston assembly of claim 5, wherein the retaining plate is fixed to a radially extending section of the piston, and the piston radially extending section is located radially between the inner and outer seals.

* * * * *